United States Patent
Xu et al.

(10) Patent No.: US 10,791,553 B2
(45) Date of Patent: Sep. 29, 2020

(54) COMMUNICATION INTERVAL CONFIGURATION METHOD AND DEVICE, STORAGE MEDIUM, AND APPARATUS

(71) Applicant: ZTE CORPORATION, Shenzhen (CN)

(72) Inventors: Hui Xu, Shenzhen (CN); Lin Chen, Shenzhen (CN); Yuqin Chen, Shenzhen (CN); Zijiang Ma, Shenzhen (CN); Yong Lv, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 23 days.

(21) Appl. No.: 16/092,927

(22) PCT Filed: Dec. 6, 2016

(86) PCT No.: PCT/CN2016/108727
§ 371 (c)(1),
(2) Date: Oct. 11, 2018

(87) PCT Pub. No.: WO2017/177699
PCT Pub. Date: Oct. 19, 2017

(65) Prior Publication Data
US 2019/0124651 A1 Apr. 25, 2019

(30) Foreign Application Priority Data
Apr. 11, 2016 (CN) .......................... 2016 1 0224141

(51) Int. Cl.
*H04W 72/04* (2009.01)
*H04W 76/20* (2018.01)
(Continued)

(52) U.S. Cl.
CPC ......... *H04W 72/0446* (2013.01); *H04W 4/46* (2018.02); *H04W 24/10* (2013.01);
(Continued)

(58) Field of Classification Search
CPC ... H04L 5/0053; H04L 5/0076; H04L 5/0087; H04W 4/46; H04W 24/10; H04W 72/04;
(Continued)

(56) References Cited

U.S. PATENT DOCUMENTS 8,611,240 B2 12/2013 Anderson
2012/0120815 A1 5/2012 Anderson
(Continued)

FOREIGN PATENT DOCUMENTS

CN 102223658 A 10/2011
CN 103348758 A 10/2013
(Continued)

OTHER PUBLICATIONS

European Patent Office, Extended European Search Report (EESR) dated May 13, 2019.
(Continued)

*Primary Examiner* — Khoa Huynh
(74) *Attorney, Agent, or Firm* — Li & Cai Intellectual Property (USA) Office

(57) ABSTRACT

The present invention provides a communication interval configuration method and device, a storage medium, and an apparatus. The method comprises: a base station receives an interface communication interval request message sent by a terminal, the interface being an interface between terminals; the base station sends an interface communication interval configuration message to the terminal according to the interface communication interval request message, and the terminal configures a communication interval for the interface according to the interface communication interval configuration message and performs a communication operation on the basis of the configured communication interval.

20 Claims, 12 Drawing Sheets

(51) Int. Cl.
*H04W 76/14* (2018.01)
*H04W 4/46* (2018.01)
*H04W 76/27* (2018.01)
*H04W 24/10* (2009.01)
*H04W 88/04* (2009.01)
*H04W 92/10* (2009.01)

(52) U.S. Cl.
CPC ........... *H04W 72/04* (2013.01); *H04W 76/14* (2018.02); *H04W 76/20* (2018.02); *H04W 76/27* (2018.02); *H04W 88/04* (2013.01); *H04W 92/10* (2013.01)

(58) Field of Classification Search
CPC . H04W 72/0446; H04W 76/14; H04W 76/20; H04W 76/27; H04W 88/04; H04W 92/10
See application file for complete search history.

(56) References Cited

U.S. PATENT DOCUMENTS

| | | | | |
|---|---|---|---|---|
| 2016/0295430 | A1* | 10/2016 | Jung | H04L 5/0053 |
| 2016/0366677 | A1* | 12/2016 | Fujishiro | H04W 76/14 |

FOREIGN PATENT DOCUMENTS

| | | |
|---|---|---|
| CN | 104325978 A | 2/2015 |
| KR | 20040068705 A | 8/2004 |
| WO | 2015170921 A1 | 11/2015 |
| WO | 2015170944 A1 | 11/2015 |

OTHER PUBLICATIONS

LG Electronics Inc: "Resource allocation enhancement for V2V", 3GPP Draft; R2-162923 Resource allocation enhancement for V2V, 3rd Generation Partnership Project (3GPP), Mobile Competence Centre; 650, Route Des Lucioles; F-06921 Sophia-antipolis Cedex; France, vol. RAN WG2, No. Dubrovnik, Croatia; Apr. 11, 2016-Apr. 15, 2016 Apr. 2, 2016, XP051082650, URL: http://www.3gpp.org/ftp/tsg_ran/WG2_RL2/TSGR2_93bis/Docs/.

"3rd Generation Partnership Project;Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", 3GPP Standard; 3GPP TS 36.300, 3rd Generation Partnership Project (3GPP), Mobile Competence Centre; 650, Route Des Lucioles; F-06921 Sophia-antipolis Cedex; France, vol. RAN WG2, No. V13.3.0, Apr. 1, 2016, pp. 1-295, XP051088532.

International Search Report in international application No. PCT/CN2016/108727, dated Feb. 24, 2017, 2 pgs.

English Translation of the Written Opinion of the International Search Authority in international application No. PCT/CN2016/108727, dated Feb. 24, 2017, 3 pgs.

\* cited by examiner

COMMUNICATION INTERVAL CONFIGURATION METHOD AND DEVICE, STORAGE MEDIUM, AND APPARATUS

TECHNICAL FIELD

The subject disclosure relates to field of communications, and in particular to a method and device for configuring a communication gap, a storage medium, and a device.

BACKGROUND

With rapid economic and social growth, there is a rapid growth in a number of cars owned in China. In the meantime, road traffic accidents may occur frequently as well. Road traffic safety has become a major factor that impacts public sense of security in China in recent years, as well as a fundamental issue that impacts social harmony and life improvement. There is a pressing need in China for improving traffic safety by technology, policy, education, etc. A major component therein is a design for enhancing vehicle safety.

Technology for enhancing vehicle safety mainly includes passive safety technology and active safety technology. Passive safety technology may serve for post-accident protection of personnel and an article inside and/or outside a vehicle. Active safety technology may serve to prevent, and reduce occurrences of, a vehicle accident, avoiding injury. Active safety technology is a focus and a trend of modern vehicle safety technology.

An international new line of thought at present in handling road traffic safety is as follows. Information may be exchanged in real time between two vehicles and/or between a vehicle and a road-side infrastructure based on collision warning in communication via advanced wireless communication and next-generation information processing, to inform of a current state of each other (which may include a route, an acceleration, a speed, a location, etc., of a vehicle) and/or information learned on a road condition, cooperate to sense a danger on a road, provide multiple collision warnings in time, prevent a road traffic accident from occurring, etc.

By Vehicle-to-Everything Communications (V2X), information on a vehicle may be provided by an electronic tag, on-board User Equipment (UE), a sensor, etc., loaded on the vehicle. Vehicle-to-Vehicle Communication (V2V), Vehicle-to-Pedestrian Communications (V2P), Vehicle-to-road (infrastructure) and/or Vehicle-to-network interconnection and/or interworking (Vehicle-to-Infrastructure/Network Communications, V2I) may be implemented using various communication technologies. Information may be used, such as extracted, shared, etc., effectively on a platform of a network of information. A vehicle may be controlled effectively. A comprehensive or integrated service may be provided to a vehicle.

In recent years, with growth of new mobile communication technology, there is international research on a V2X-based application by Long Term Evolution (LTE) technology. A Road Side Unit (RSU) may receive a request by a vehicle and guarantee Internet access by the vehicle by serving as a gateway. In addition, the RSU may as well serve to operate, store, and/or forward data, etc.

Currently, V2X may be implemented by Dedicated Short Range Communication (DSRC) and/or by LTE. DSRC is based on a series of standards of IEEE802.11P and IEEE1609. 802.11P may be responsible for technology of Medium Access Control (MAC) and a physical stratum. 1609 may be responsible for specification at an upper stratum. Discussion has just started on LTE-based V2X, with no standard thereof whatsoever.

Current LTE V2X technology under discussion in the 3rd Generation Partnership Project (3GPP) is as follows. An RSU may be implemented by a static UE or eNB. V2V/V2I/V2P may be implemented by an interface PC5 or an interface Uu. An interface PC5 may refer to a Device-to-Device (D2D) air interface. An interface Uu may refer to a UE-to-eNB air interface. System architecture of sending a V2X service by an interface PC5 is as shown in FIG. 1.

A D2D topic of 3GPP release-13 researches implementation of a D2D discovery gap. Namely, to guarantee Quality of service (QoS) of Public Safety (PS) discovery, a number of intra-frequency/inter-frequency discovery gap sub-frames may be set. UE having a single transceiver may perform no Uu operation (except for random access, a measurement gap, etc.) in a discovery gap sub-frame, and instead perform a discovery operation.

A newly projected 3GPP topic may include enhanced D2D, directed mainly to application of Internet Of Thing (IOT)/Machine Type Communication (MTC) and Wearable devices (Wearables). Wearable devices may communicate with a network by a UE-to-network relay (a relay between the UE and the network). Wearables UE covered by an eNB may communicate by an interface PC5 or an interface Uu. At least uplink data may be communicated by PC5. Architecture of communication using a UE-to-network relay is as shown in FIG. 2.

Existing art is disadvantageous for reasons as follows. A V2X service directed to safety may be implemented using PC5 communication. Wearables/IOT devices are of low cost and have for example but a single transceiver (that is, they may perform but a receiving or sending operation at one frequency each time). However, Wearables/IOT devices, as well as a UE-to-network relay, may have to support at the same time both a PC5 operation (between UE, i.e., between terminals) and a Uu operation (between UE and a Base Station, BS). Currently, no design supports a PC5 communication gap, which may lead to a failure of a V2X/Wearables/IOT/relay communication operation.

No effective solution has been proposed for lack of a technical definition of a design of a PC5 communication gap in related art. Thereby, PC5 and Uu operations cannot be supported at the same time.

SUMMARY

Embodiments herein provide a method and device for configuring a communication gap, a storage medium, and a device, capable of supporting PC5 and Uu operations at the same time.

According to an aspect herein, a method for configuring a communication gap includes: receiving, by a Base Station (BS), a request for a communication gap at an inter-UE interface sent by User Equipment (UE); and informing the UE by the BS according to the request for the communication gap at the inter-UE interface, of an interface communication gap configuration. The UE configures the communication gap at the inter-UE interface according to the interface communication gap configuration. The UE communicates based on the communication gap configured.

According to an aspect herein, a method for configuring a communication gap includes: sending, by User Equipment (UE) to a Base Station (BS), a request for a communication gap at an inter-UE interface; receiving, by the UE, information on an interface communication gap configuration sent by the BS according to the request for the communication gap at the inter-UE interface; configuring, by the UE according to the interface communication gap configuration, the communication gap at the inter-UE interface; and communicating by the UE based on the communication gap configured.

According to an aspect herein, a device for configuring a communication gap applies to a Base Station (BS). The device includes a receiving module and a sending module.

The receiving module is arranged for receiving a request for a communication gap at an inter-UE interface sent by User Equipment (UE).

The sending module is arranged for: informing the UE according to the request for the communication gap at the inter-UE interface, of an interface communication gap configuration. The UE configures the communication gap at the inter-UE interface according to the interface communication gap configuration. The UE communicates based on the communication gap configured.

According to an aspect herein, a device for configuring a communication gap applies to User Equipment (UE). The device includes a sending module, a receiving module, a configuring module, and a communication module.

The sending module is arranged for sending, to a Base Station (BS), a request for a communication gap at an inter-UE interface.

The receiving module is arranged for receiving information on an interface communication gap configuration sent by the BS according to the request for the communication gap at the inter-UE interface.

The configuring module is arranged for configuring, according to the interface communication gap configuration, the communication gap at the inter-UE interface.

The communication module is arranged for communicating based on the communication gap configured.

According to an aspect herein, a computer storage medium stores therein computer-executable instructions for executing at least one method herein.

According to an aspect herein, a Base Station (BS) includes: a storage medium for storing executable instructions; and a processor for executing the executable instructions stored.

The executable instructions include: receiving a request for a communication gap at an inter-UE interface sent by User Equipment (UE); and informing the UE according to the request for the communication gap at the inter-UE interface, of an interface communication gap configuration. The UE configures the communication gap at the inter-UE interface according to the interface communication gap configuration. The UE communicates based on the communication gap configured.

According to an aspect herein, User Equipment (UE) includes: a storage medium for storing executable instructions; and a processor for executing the executable instructions stored.

The executable instructions including: sending, to a Base Station (BS), a request for a communication gap at an inter-UE interface; receiving information on an interface communication gap configuration sent by the BS according to the request for the communication gap at the inter-UE interface; configuring, according to the interface communication gap configuration, the communication gap at the inter-UE interface; and communicating based on the communication gap configured.

With embodiments herein, a BS informs UE of an interface communication gap configuration. Thereby, the UE configures a communication gap between UE interfaces according to the communication gap configuration, and communicates based on the communication gap configured. In this way, a technical definition of a design of a PC5 communication gap is provided. PC5 and Uu operations are thus supported at the same time. Thereby, UE is allowed to support operations with other UE and with a BS at the same time.

BRIEF DESCRIPTION OF THE DRAWINGS

A drawing illustrated herein is provided for further understanding of an embodiment herein, and forms a part of the subject disclosure. An illustrative embodiment herein and description thereof are for explaining the subject disclosure, and may not limit the subject disclosure improperly.

DETAILED DESCRIPTION

The subject disclosure is elaborated below with reference to the drawings and embodiments. Note that embodiments herein and features thereof can be combined with each other as long as no conflict results from the combination.

Note that a term such as "first", "second", etc., used herein is but for differentiating similar objects, instead of denoting any specific order.

Figure 1:
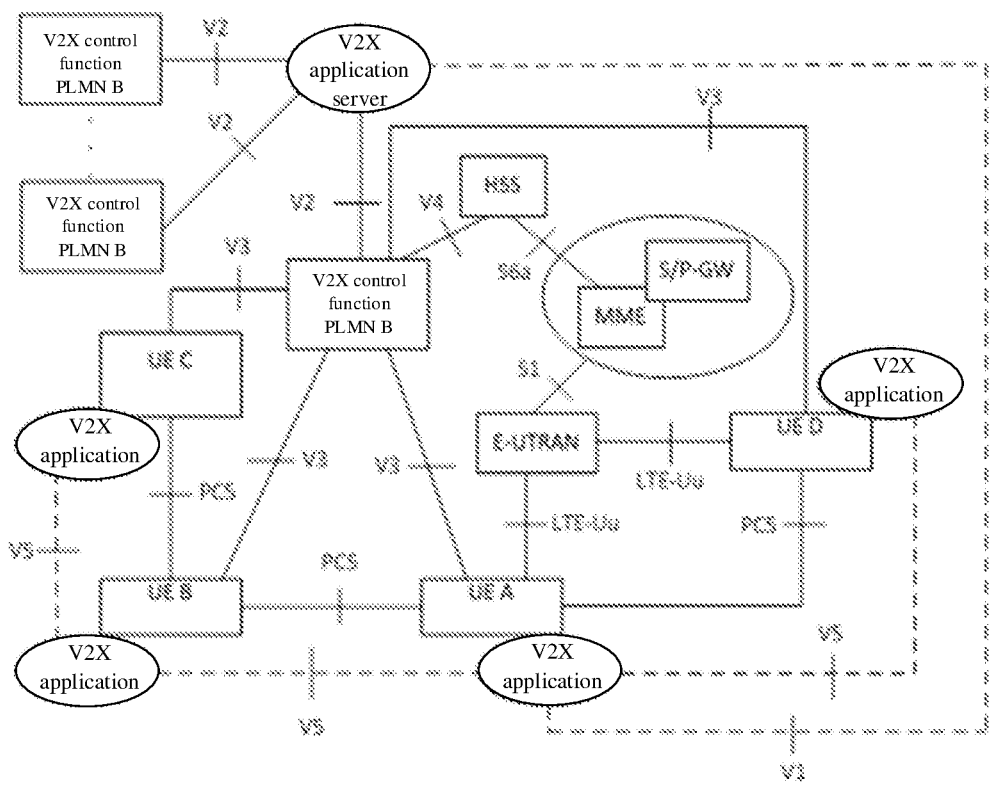
FIG. 1 is a diagram of architecture of transmitting a V2X service by an interface PC5 in related art.
Figure 2:
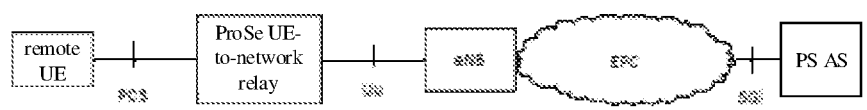
FIG. 2 is model architecture of communication using a UE-to-network relay in related art.
Figure 3:
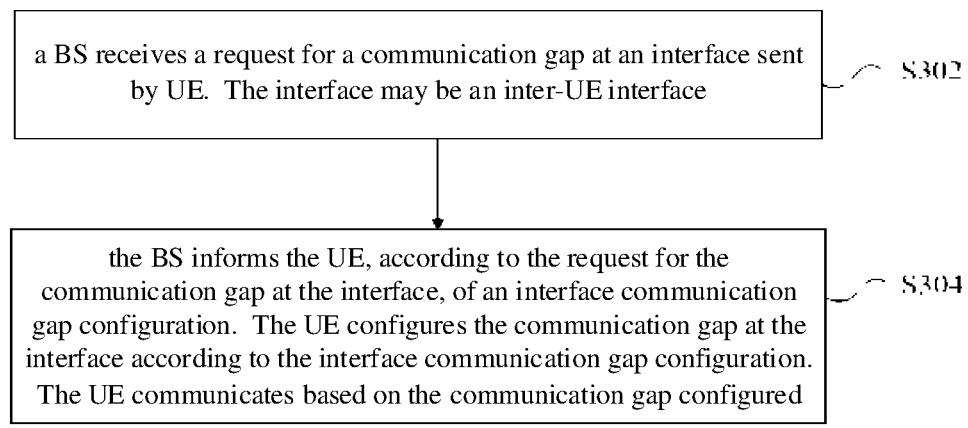
FIG. 3 is a flowchart of a method for configuring a communication gap according to an embodiment herein.

An embodiment herein provides a method for configuring a communication gap. FIG. 3 is a flowchart of a method for configuring a communication gap according to an embodiment herein. As shown in FIG. 3, the flow may include an option as follows.

In S302, a BS receives a request for a communication gap at an interface sent by UE. The interface may be an inter-UE interface.

In S304, the BS informs the UE, according to the request for the communication gap at the interface, of an interface communication gap configuration. The UE configures the communication gap at the interface according to the interface communication gap configuration. The UE communicates based on the communication gap configured.

With the options, a BS informs UE of an interface communication gap configuration. Thereby, the UE configures a communication gap between UE interfaces according to the communication gap configuration, and communicates based on the communication gap configured. In this way, a technical definition of a design of a PC5 communication gap is provided. PC5 and Uu operations are thus supported at the same time. Thereby, UE is allowed to support operations with other UE and with a BS at the same time.

The BS may receive the request for the communication gap at the interface sent by the UE as follows. The BS may receive the request for the communication gap at the inter-UE interface sent by the UE. Alternatively, the BS may receive, via a relay, the request for the communication gap at the inter-UE interface sent by the UE. The relay may be a UE-to-network relay, a UE-type Road Side Unit (RSU), etc.

Before the BS receives the request for the communication gap at the interface sent by the UE, the BS may send the UE an interface communication gap indication. The interface communication gap indication may indicate whether the BS supports the communication gap at the interface. The interface communication gap indication may be sent by at least one of system broadcast information, Radio Resource Control (RRC) signaling, physical-stratum signaling, Media Access Control (MAC) Control Element (CE) signaling, etc.

The request for the communication gap at the interface may be sent by at least one of RRC signaling, physical-stratum signaling, MAC CE signaling, etc. Information on the interface communication gap configuration may be sent by at least one of the RRC signaling, the physical-stratum signaling, the MAC CE signaling, etc.

The request for the communication gap at the interface may include at least one of information on a location of an interface communication gap sub-frame, an interface communication frequency, an interface reception or sending indication, a Scheduling Assignment (SA) or data indication, etc. The interface reception or sending indication may indicate whether the communication gap is for reception or sending at the interface. The SA or data indication may indicate whether the communication gap is for data or SA at the interface. The interface communication gap sub-frame may be for communication between interfaces. The interface communication frequency may refer to a carrier frequency used for communication via the interface. The information on the location of the sub-frame may be indicated by a field such as a gap cycle, a bitmap/pattern, an offset, etc. An embodiment herein sets no limit to such indication.

The interface communication gap configuration may include at least one of a configuration of an interface communication gap sub-frame, a cycle of the communication gap, a carrier frequency used at the communication gap, an interface reception or sending indication, a Scheduling Assignment (SA) or data indication, etc.

When the UE has configured the communication gap at the interface, a first priority of communication via the inter-UE interface may be set to be higher than a second priority of communication via an interface Uu. When the UE is in random access or a measurement gap, the second priority may be set to be higher than the first priority. Communication via an interface Uu may be sending, reception, etc.

To turn down the request by the UE, the BS may inform of no interface communication gap configuration, or send a turndown indication to the UE. The BS may cancel the information on the interface communication gap configuration being sent, by at least one of sending an indication to cancel the interface communication gap configuration, sending a new communication gap configuration, configuring a timer for cancelling, upon expiration of the timer, the information on the interface communication gap configuration being sent, etc.

An interface herein may include at least one of an interface PC5, a Vehicle-to-Vehicle Communication (V2V) interface in Long Term Evolution (LTE), a Vehicle-to-Infrastructure Communications (V2I) interface in LTE, a Vehicle-to-Pedestrian Communications (V2P) interface, a Wireless Fidelity (WiFi) interface, a Bluetooth (BT) interface, a (wireless) Dedicated Short Range Communication (DSRC) interface, etc.

Figure 4:
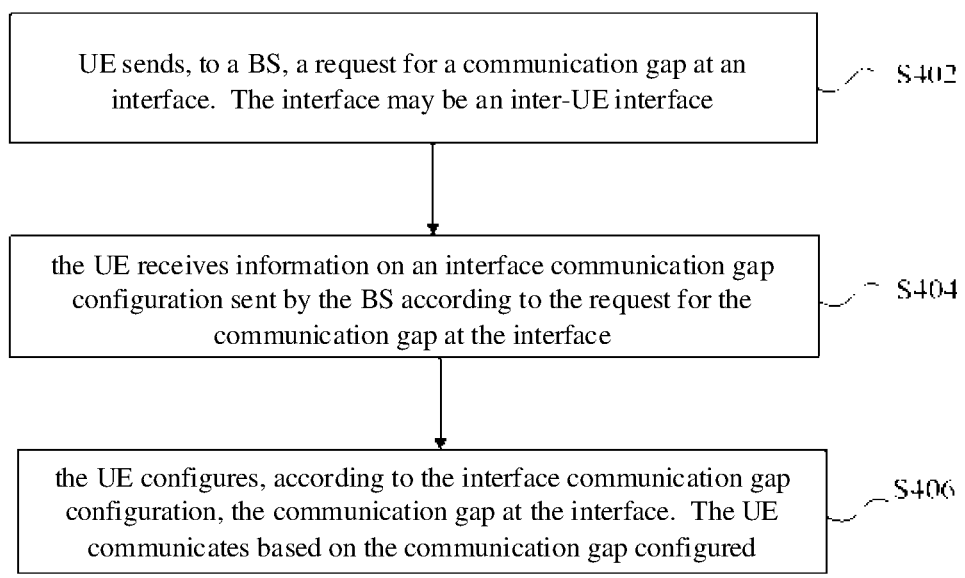
FIG. 4 is a flowchart of a method for configuring a communication gap according to an embodiment herein.

An embodiment herein provides a method for configuring a communication gap. FIG. 4 is a flowchart of a method for configuring a communication gap according to an embodiment herein. As shown in FIG. 4, the flow may include an option as follows.

In S402, UE sends, to a BS, a request for a communication gap at an interface. The interface may be an inter-UE interface.

In S404, the UE receives information on an interface communication gap configuration, which is sent by the BS according to the request for the communication gap at the interface.

In S406, the UE configures, according to the interface communication gap configuration, the communication gap at the interface. The UE communicates based on the communication gap configured.

With the options, UE sends, to a BS, a request for a communication gap. Thereby, the UE configures a communication gap between UE interfaces according to information on a configuration of the communication gap issued by the BS, and communicates based on the communication gap configured. In this way, a technical definition of a design of a PC5 communication gap is provided. PC5 and Uu operations are thus supported at the same time. Thereby, UE is allowed to support operations with other UE and with a BS at the same time.

The UE may send the BS the request for the communication gap at the interface as follows. The UE may send the BS the request for the communication gap at the interface. Alternatively, the UE may send, to the BS via a relay, the request for the communication gap at the interface. The relay may include at least one of a UE-to-network relay, a UE-type Road Side Unit (RSU), etc.

Before sending, to the BS, the request for the communication gap at the interface, the UE may receive an interface communication gap indication sent by the BS. The interface communication gap indication may indicate whether the BS supports the communication gap at the interface. The interface communication gap indication may be sent by at least one of system broadcast information, Radio Resource Control (RRC) signaling, physical-stratum signaling, Media Access Control (MAC) Control Element (CE) signaling, etc.

The request for the communication gap at the interface may be sent by at least one of RRC signaling, physical-stratum signaling, MAC CE signaling, etc. The information on the interface communication gap configuration may be sent by at least one of the RRC signaling, the physical-stratum signaling, the MAC CE signaling, etc.

The request for the communication gap at the interface may include at least one of information on a location of an interface communication gap sub-frame, an interface communication frequency, an interface reception or sending indication, a Scheduling Assignment (SA) or data indication, etc. The interface reception or sending indication may indicate whether the communication gap is for reception or sending at the interface. The SA or data indication may indicate whether the communication gap is for data or SA at the interface. The interface communication gap sub-frame may be for communication between interfaces. The interface communication frequency may refer to a carrier frequency used for communication via the interface. The information on the location of the sub-frame may be indicated by a field such as a gap cycle, a bitmap/pattern, an offset, etc. An embodiment herein sets no limit to such indication.

The interface communication gap configuration may include at least one of a configuration of an interface communication gap sub-frame, a cycle of the communication gap, a carrier frequency used at the communication gap, an interface reception or sending indication, a Scheduling Assignment (SA) or data indication, etc.

When the UE has configured the communication gap at the interface, a first priority of communication via the inter-UE interface may be set to be higher than a second priority of communication via an interface Uu. When the UE is in random access or a measurement gap, the second priority may be set to be higher than the first priority.

The UE may send the BS the request for the communication gap at the interface in at least one case as follows.

An interface communication gap indication received by the UE may indicate that the BS supports the communication gap at the interface.

An upper stratum of the UE may have requested the communication gap. The upper stratum may be an application stratum, a service stratum, a Non-Access Stratum (NAS), etc.

There may be a change in configuration to the UE of a resource for communication at the interface.

There may be a change in a demand for the communication gap by the UE.

The UE may send the request for the communication gap at the interface by at least one of RRC signaling, physical-stratum signaling, MAC CE signaling, etc.

An interface herein may include at least one of an interface PC5, a Vehicle-to-Vehicle Communication (V2V) interface in Long Term Evolution (LTE), a Vehicle-to-Infrastructure Communications (V2I) interface in LTE, a Vehicle-to-Pedestrian Communications (V2P) interface, a Wireless Fidelity (WiFi) interface, a Bluetooth (BT) interface, a DSRC interface, etc.

The technical solution according to an aforementioned embodiment is explained and illustrated below from a perspective of interaction between a BS and UE with an example, which is not intended to limit the technical solution according to an embodiment herein.

An embodiment herein may include a UE device (or terminal equipment, equivalent to UE according to an aforementioned embodiment) and an access network device (equivalent to a BS according to an aforementioned embodiment). Such a UE device may include at least one of an On-Board Unit (OBU), a Road-Side Unit (RSU), UE, Wearable devices, a UE-to-network relay, an IOT/MTC UE. A UE device may receive a PC5 communication gap indication sent by an access network device. The UE device may send, according to the indication, a request for a PC5 communication gap. The UE device may be informed of a PC5 communication gap configuration by the access network device as requested by the UE.

An access network device may include at least a BS/evolved Node B (eNB). The eNB may send a UE device a PC5 communication gap indication. The eNB may receive a request for a PC5 communication gap sent by the UE device. The eNB may send the UE device a PC5 communication gap configuration.

A PC5 communication gap may be for PC5 communication in Mode 2. Namely, UE may independently select a resource for PC5 communication. For PC5 communication in Mode 1, a communication resource may be configured by an eNB upon request by UE, in which case no PC5 communication gap is required. In Mode 1 directed to a specific scene, a PC5 communication gap may be adopted as well, such as when Semi-Persistent Scheduling is adopted for PC5.

According to an existing 3GPP specification, communication at an interface Uu, D2D communication, and D2D discovery are of descending priorities. If a PC5 communication gap has been configured, D2D communication may be performed first, overlooking Uu communication (such as of UE of a single transceiver), with the exception of random access or a measurement gap. Namely, even if a present sub-frame is configured as a PC5 communication gap, the configuration of the PC5 communication gap has no impact on UE requiring random access or UE configured with a measurement gap. Random access may be of higher priority than a PC5 communication gap. Priorities of a measurement gap and a PC5 communication gap may be specified beforehand or may be determined by an eNB. For example, a measurement gap may be of a higher priority than a PC5 communication gap.

Generally speaking, different resource pools may be configured for D2D communication and D2D discovery. Accordingly, one sub-frame will not be configured as both a PC5 communication gap and a discovery gap. In case a sub-frame is indeed configured as both a PC5 communication gap and a discovery gap, the PC5 communication gap may be considered to be of a higher priority than the discovery gap. Namely, PC5 communication may be performed first at the gap sub-frame.

If a D2D service and a V2X service exist at the same time, the V2X service may generally be configured in a resource pool different from that including the D2D service. If the D2D service and the V2X service share a a resource pool for PC5 communication, and a PC5 communication gap has been configured, then priorities of different services may be determined by an eNB, or may be specified beforehand. For example, a PS D2D service may be of a higher priority than a V2X service. Namely, the PC5 communication gap may be used first for the PS D2D service.

A resource pool used by an inter-UE interface may be set to have a higher priority than communication at an interface Uu. Then, UE may prioritize communication via the inter-UE interface. The communication may be reception, sending, etc. Priorities of reception and sending may be set separately.

When UE independently selects a resource for communication via an inter-UE interface, such as by determining a resource required for communication via the inter-UE interface using a sensing method (such as sensing or Listen Before Talk, LBT), the resource may be set to have a higher priority than communication at an interface Uu. Namely, UE communication via the inter-UE interface may be prioritized. The communication may be reception, sending, etc. Priorities of reception and sending may be set separately.

Existing D2D communication is implemented by controlling SA plus data. Namely, first a location of a resource for data may be indicated by SA, then the data may be sent on the location. SA may be more critical for correct sending and reception of D2D communication. Frequency Division Multiplexing (such as one sub-frame) or Time Division Multiplexing (such as different sub-frames) may be adopted for SA and data. To guarantee QoS of SA, use of a PC5 communication gap for SA may be prioritized. A PC5 communication gap may also be used for data.

A PC5 communication gap may apply to reception and/or sending of D2D communication, intra-frequency or inter-frequency, etc. By intra-frequency, it means that a frequency is shared by Uu communication and PC5 communication. By inter-frequency, it means that a frequency is dedicated to PC5 communication.

PC5 may refer to an inter-UE interface, which may also be referred to by other names (such as a side link). Wireless transmission technology, such as Prose of licensed spectra, Wireless Local Area Networks (WLAN)/WiFi (such as 802.11 series), Bluetooth, or Infrared, etc., may be adopted for an interface PC5.

The technical solution may be implemented by options 1 to 5 as follows.

In Option 1, an eNB may send a PC5 communication gap indication.

The indication may be sent by at least one of system broadcast information, dedicated RRC signaling, L1/2 signaling (such as physical-stratum signaling or MAC CE signaling), etc.

The PC5 communication gap indication may indicate whether the eNB supports a request for a PC5 communication gap, such as with a Boolean variable or one bit. For example, by true or 1, it may mean that the eNB supports the request. By false or 0, it may mean that the eNB does not support or cancels an existing PC5 communication gap configuration.

In Option 2, UE may send the eNB a request for a PC5 communication gap.

In addition to or apart from that the eNB supports sending, by the UE, the request for the PC5 communication gap, a trigger condition for the UE to send the request may further include at least one of a request by an upper stratum (such as an application stratum, a service stratum, or a Non-Access Stratum, NAS, etc.) of the UE for the PC5 communication gap, a change in configuration to the UE of a resource for PC5 communication, a change in a demand for the PC5 communication gap by the UE, etc. An upper stratum of the UE may request a PC5 communication gap from an Access Stratum (AS). A change in configuration of a resource for PC5 communication may refer to a change in a resource in a resource pool for PC5 communication, such as a change in a pool for PC5 communication in inter-freq SIB18. A change in a demand for the PC5 communication gap may refer to that the UE demands more or less resources for the PC5 communication gap, or no longer requires the resources.

The UE may send the request by at least one of dedicated RRC signaling, L1/2 signaling (such as physical-stratum signaling, MAC signaling, . . . ), etc. The request may include information on at least one of a location of a PC5 communication gap sub-frame, frequency information, a reception or sending indication.

The request may further include a Scheduling Assignment (SA) or data indication.

A location of a PC5 communication gap sub-frame may refer to a sub-frame when the UE is to send or receive PC5 communication. Frequency information may refer to a frequency at which the UE is to send or receive PC5 communication. If the request includes no frequency information, then intra-frequency is requested. A reception or sending indication may indicate whether the PC5 communication gap is for reception or sending. An SA or data indication may indicate whether the PC5 communication gap is for SA or data.

There may be one or more such sub-frames. Such a sub-frame may be indicated by bitmap using a pool for PC5 communication configured in system broadcast information (such as SIB18).

Note that UE may have to request a PC5 communication gap only when the UE performs PC5 communication in Mode 2, i.e., when the UE independently selects a communication resource. For communication in Mode 1, as a resource for D2D communication is scheduled by an eNB, no PC5 communication gap has to be requested. UE may select a resource for D2D communication according to quality of a reference signal (such as Reference Signal Received Power, RSRP), a pre-configuration, etc.

UE may be a single transceiver. The UE may select a resource for PC5 communication in Mode 2. Intra-frequency or inter-frequency communication at an interface Uu may have to be performed on a selected sub-frame. The UE may send an eNB request for a PC5 communication gap, to guarantee QoS of PC5 communication (such as a V2X service of a higher priority).

UE may send a request for a PC5 communication gap after determining that an eNB supports the request. Otherwise, the UE may send no such request when the UE cannot determine whether the eNB supports such a request.

UE may send an eNB a request for a PC5 communication gap directly or by a UE-to-network relay. The UE may send the eNB the request for the PC5 communication gap by the UE-to-network relay by sending the relay the request for the PC5 communication gap by PC5. Having received the request, the relay may forward the request to the eNB by an interface Uu. The UE may be under coverage of the eNB. The UE may receive downlink information sent by the eNB (such as indication of supporting the PC5 communication gap). The UE may send uplink information to the eNB by a relay.

In Option 3, the eNB may configure the PC5 communication gap and inform the UE of the configuration.

The eNB may configure a PC5 communication gap sub-frame according to the request for the PC5 communication gap sent by the UE. A configured sub-frame may or may not be identical to a sub-frame requested by the UE. The eNB may notify the UE of the configuration by at least one of system broadcast information, dedicated RRC signaling, L1/2 signaling (such as physical-stratum signaling, MAC signaling, . . . ), etc.

A PC5 communication gap configuration may include information on at least one of a location of a PC5 communication gap sub-frame, a cycle of a PC5 communication gap, a frequency, etc. A cycle of a PC5 communication gap may be set to be consistent with a cycle of a resource pool for PC5 communication. The frequency may apply to the PC5 communication gap. The configuration may further include at least one of a reception or sending indication, an SA or data indication, etc.

A PC5 communication gap may be directed to specific UE (that has sent a request for the PC5 communication gap). The PC5 communication gap may be effective in any cell to which the UE may connect (when no frequency information is configured), or just in a specific cell (when the configuration includes frequency information).

To turn down a gap request sent by UE, an eNB may inform of no gap configuration or send the UE a turndown indication.

An eNB may cancel an existing PC5 communication gap configuration, by at least one of sending an indication to cancel the gap configuration, informing of a new gap configuration, configuring a timer (for cancelling the gap configuration upon timeout/expiration of the timer, for example), etc.

In Option 4, the UE may communicate according to the PC5 communication gap configured.

The UE may receive the information on the PC5 communication gap configuration sent by the eNB, and communicate via an interface PC5 according to the configuration received.

Note that if UE is to perform random access at a subframe and a frequency configured for a PC5 communication gap, the UE may overlook the PC5 communication gap configuration and perform random access, including Msg1-4 for random access. If a measurement gap is configured at a sub-frame and a frequency configured for a PC5 communication gap, then processing may be performed according to a rule pre-defined or as indicated by an eNB.

A method according to an embodiment herein may apply to a V2X service, a Wearables service, MTC, PS communication, IOT, a UE-to-network relay, etc.

With description of the implementation herein, those skilled in the art may clearly understand that a method of an embodiment herein may be implemented by hardware, or often better, by software plus a necessary general hardware platform. Based on such an understanding, the essential part or the part contributing to prior art of a technical solution herein may be embodied in form of a software product. The computer software product may be stored in a volatile or nonvolatile memory medium, such as a Read Only Memory (ROM), a Random Access Memory (RAM), a magnetic disk, a CD, etc., that includes a number of instructions that allow terminal equipment, such as a mobile phone, a computer, a server, a network device, etc., to execute the method according to an embodiment herein.

An embodiment herein provides a device for configuring a communication gap, applying to a Base Station (BS). The device may be arranged for implementing an aforementioned embodiment and implementation, illustration of which that has been made will not be repeated. A term "module" as used herein may refer to a combination of software and/or hardware capable of implementing a pre-defined function. The device according to an embodiment as follows may be implemented by software. Implementing by hardware or a combination of software and hardware may be conceived as well.

Figure 5:
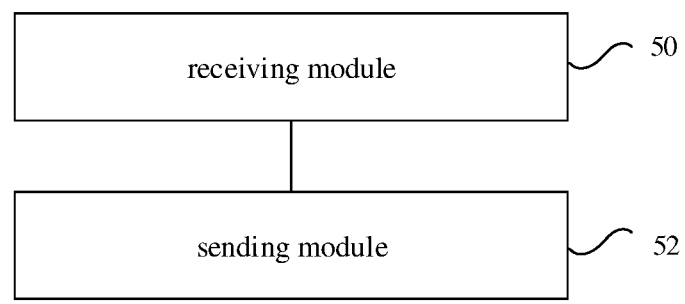
FIG. 5 is a block diagram of a structure of a device for configuring a communication gap according to an embodiment herein.

FIG. 5 is a block diagram of a structure of a device for configuring a communication gap according to an embodiment herein. As shown in FIG. 5, the device includes a receiving module and a sending module.

The receiving module 50 is arranged for receiving a request for a communication gap at an inter-UE interface sent by User Equipment (UE).

The sending module 52 is arranged for: informing the UE according to the request for the communication gap at the inter-UE interface, of an interface communication gap configuration. The UE configures the communication gap at the interface according to the interface communication gap configuration. The UE communicates based on the communication gap configured.

With the modules, UE is informed of an interface communication gap configuration. Thereby, the UE configures a communication gap between UE interfaces according to the communication gap configuration, and communicates based on the communication gap configured. In this way, a technical definition of a design of a PC5 communication gap is provided. PC5 and Uu operations are thus supported at the same time. Thereby, UE is allowed to support operations with other UE and with a BS at the same time.

Figure 6:
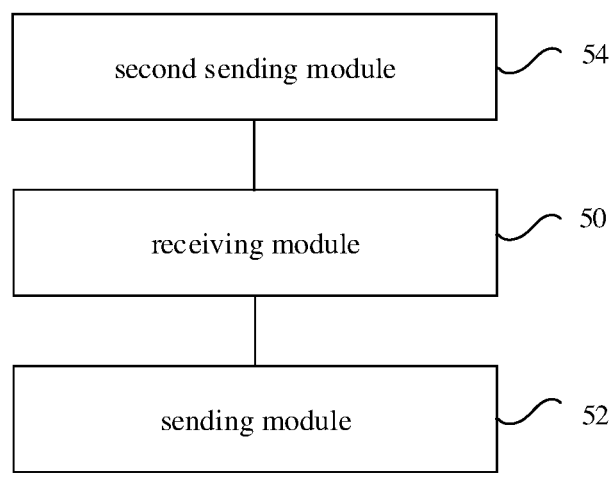
FIG. 6 is a block diagram of a structure of a device for configuring a communication gap according to an embodiment herein.

FIG. 6 is a block diagram of a structure of a device for configuring a communication gap according to an embodiment herein. As shown in FIG. 6, the device may include a second sending module.

The second sending module 54 may be arranged for sending, to the UE, an interface communication gap indication. The interface communication gap indication may indicate whether the BS supports the communication gap at the interface.

The receiving module 50 may be further arranged for receiving the request for the communication gap at the inter-UE interface sent by the UE, or receiving, via a relay, the request for the communication gap at the inter-UE interface sent by the UE. The relay may include at least one of a UE-to-network relay, a UE-type Road Side Unit (RSU), etc.

An embodiment herein provides a device for configuring a communication gap, applying to User Equipment (UE). The device may be arranged for implementing an aforementioned embodiment and implementation, illustration of which that has been made will not be repeated. A term "module" as used herein may refer to a combination of software and/or hardware capable of implementing a pre-defined function. The device according to an embodiment as follows may be implemented by software. Implementing by hardware or a combination of software and hardware may be conceived as well.

Figure 7:
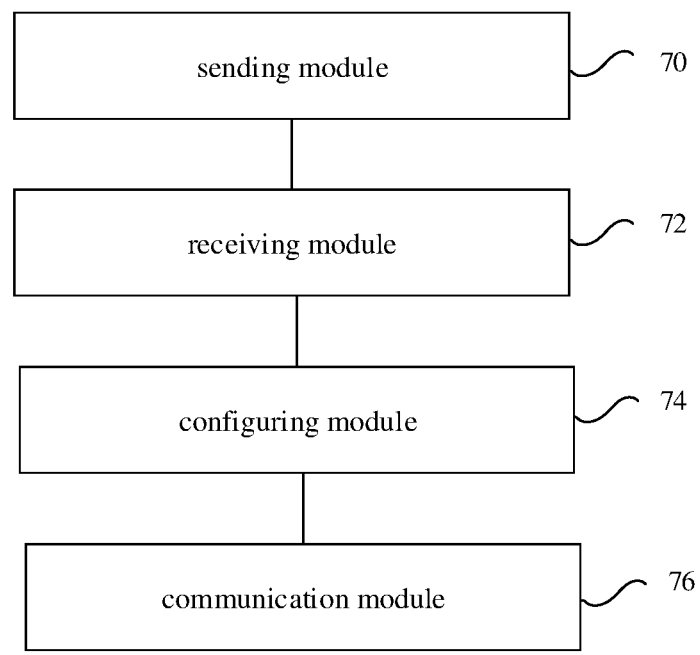
FIG. 7 is a block diagram of a structure of a device for configuring a communication gap according to an embodiment herein.

FIG. 7 is a block diagram of a structure of a device for configuring a communication gap according to an embodiment herein. As shown in FIG. 7, the device includes a sending module, a receiving module, a configuring module, and a communication module.

The sending module 70 is arranged for sending, to a Base Station (BS), a request for a communication gap at an interface. The interface may be an inter-UE interface.

The receiving module 72 is arranged for receiving information on an interface communication gap configuration sent by the BS according to the request for the communication gap at the interface.

The configuring module 74 is arranged for configuring, according to the interface communication gap configuration, the communication gap at the interface.

The communication module 76 is arranged for communicating based on the communication gap configured.

With the modules, UE sends, to a BS, a request for a communication gap. Thereby, the UE configures a communication gap between UE interfaces according to information on a configuration of the communication gap issued by the BS, and communicates based on the communication gap configured. In this way, a technical definition of a design of a PC5 communication gap is provided. PC5 and Uu operations are thus supported at the same time. Thereby, UE is allowed to support operations with other UE and with a BS at the same time.

Figure 8:
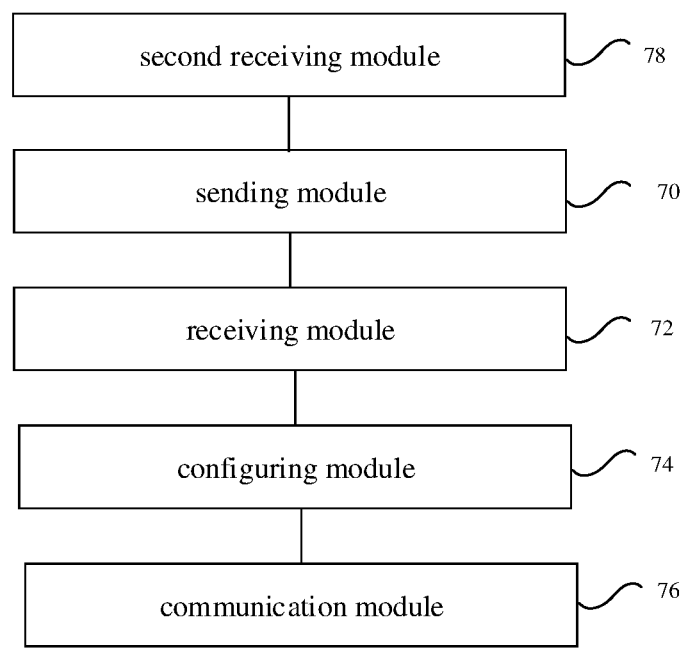
FIG. 8 is a block diagram of a structure of a device for configuring a communication gap according to an embodiment herein.

FIG. 8 is a block diagram of a structure of a device for configuring a communication gap according to an embodiment herein. As shown in FIG. 8, the device may include a second receiving module.

The second receiving module 78 may be arranged for: receiving an interface communication gap indication sent by the BS. The interface communication gap indication may indicate whether the BS supports the request for the communication gap at the inter-UE interface.

Modules of a device may be combined or further divided as needed.

The technical solution is illustrated as follows with embodiments.

UE may request a PC5 communication gap.

Figure 9:
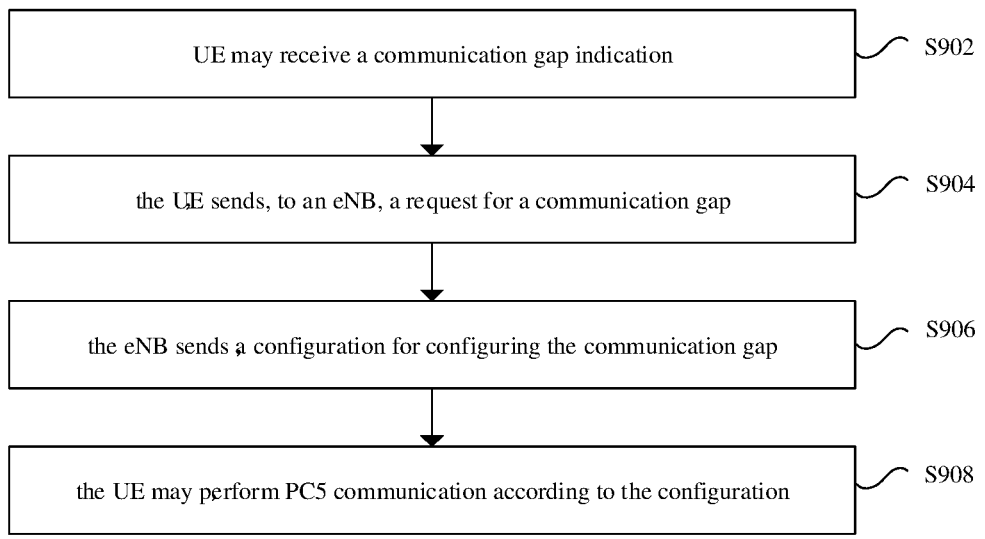
FIG. 9 is a flowchart according to an embodiment herein.

FIG. 9 is a flowchart according to an embodiment herein. An embodiment herein provides a method for requesting a PC5 communication gap by UE. Referring to FIG. 9, the method may include an option as follows.

In S902, UE may receive an indication sent by an eNB.

The indication may indicate whether the eNB supports a request for a PC5 communication gap.

In S904, the UE may send the eNB a request for a PC5 communication gap.

The UE may have a single transceiver. Namely, the UE may not receive or send data at different frequencies at the same time. The UE may participate in D2D communication at PC5. D2D communication may be performed in a mode such as a Proximity-based Services (Prose) mode related to licensed spectra in 3GPP, WLAN related to unlicensed spectra, BT, etc. The UE may be limited by Half-duplex in PC5 communication. Namely, the UE may not receive or send data at the same time on PC5.

A trigger condition triggering a request for a PC5 communication gap by UE may include any of a request by an upper stratum (such as an application stratum, a service stratum, or a NAS, etc.) of the UE for the PC5 communication gap, a change in configuration to the UE of a resource for PC5 communication, a change in a demand for the PC5 communication gap by the UE, etc.

Note that UE may have to request a PC5 communication gap only when the UE performs D2D communication in Mode 2, i.e., when the UE independently selects a communication resource. For communication in Mode 1, as a resource for D2D communication is scheduled by an eNB, no PC5 communication gap has to be requested. UE may select a resource for D2D communication according to quality of a reference signal (such as RSRP), a pre-configuration, etc.

UE may select a resource for PC5 communication in Mode 2. Communication at an interface Uu may have to be performed on a selected intra-frequency or inter-frequency sub-frame. The UE may send an eNB a request for a PC5 communication gap, to guarantee QoS of D2D communication (such as a V2X service of a higher priority).

UE may send a request for a PC5 communication gap after determining that an eNB supports the request. Otherwise, the UE may send no such request when the UE cannot determine whether the eNB supports such a request.

The request may include at least: a location of a sub-frame, a frequency (applying to the sub-frame). The request may further include one of a reception or sending indication, an SA or data indication, etc. The request may be sent by RRC signaling, physical-stratum signaling, Media Access Control (MAC) Control Element (CE), etc.

In S906, the eNB may inform the UE of a PC5 communication gap configuration.

An eNB may configure a PC5 communication gap according to a load of an interface Uu. The eNB may inform the UE of the PC5 communication gap configuration. The configuration may include information on at least one of a location of a PC5 communication gap sub-frame, a cycle of a PC5 communication gap, a frequency, etc. A cycle of a PC5 communication gap may be set to be consistent with a cycle of a D2D comm Pool. The frequency may apply to the PC5 communication gap. The configuration may further include at least one of a reception or sending indication, an SA or data indication, etc.

An eNB may accept or turn down a request for a PC5 communication gap. After an eNB has configured a PC5 communication gap, the eNB may cancel the PC5 communication gap configuration.

In S908, the UE may communicate according to the PC5 communication gap configuration.

UE may first determine whether a random access process takes place at a PC5 communication gap sub-frame. If so, the UE may perform random access first (including msg1-4 sending and/or reception). Then, the UE may determine whether there is a measurement gap. If there is, the UE may perform processing (such as that related to the measurement gap) according to a rule pre-defined or as indicated by an eNB. If there is no random access and no measurement gap, then UE may perform D2D communication, and overlook other (intra-frequency or inter-frequency) Uu communication or PC5 communication/discovery.

If UE cannot perform PC5 communication at a configured PC5 communication gap, then UE may select to perform PC5 communication at a sleep opportunity in Discontinuous Reception (DRX) configured for an interface Uu.

UE may request a PC5 communication gap via a relay.

Figure 10:
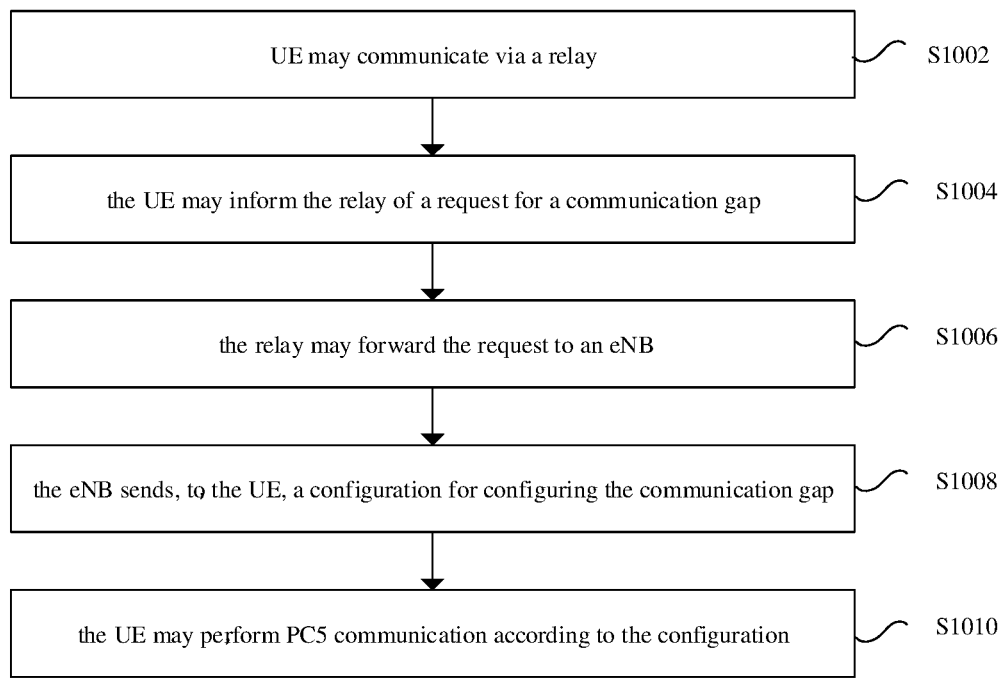
FIG. 10 is a flowchart according to an embodiment herein.

FIG. 10 is a flowchart according to an embodiment herein. An embodiment herein provides a method for requesting a PC5 communication gap via a relay. Referring to FIG. 10, the method may include an option as follows.

In S1002, remote UE may communicate via a relay.

Remote UE may be under coverage of an eNB. The UE may receive downlink information sent by the eNB. The UE may send uplink information to the eNB by a relay. The relay may be at least one of a UE-to-network relay, a UE-type RSU, etc. A UE-to-network relay may be a Stratum 2 or Stratum 3 relay.

An interface PC5 may be between remote UE and a relay. An interface Uu may be between a relay and an eNB. Remote UE may receive, via an interface Uu, an indication of whether an eNB supports a request for a PC5 communication gap.

In S1004, the remote UE may send the relay a request for a PC5 communication gap.

Remote UE may have to receive information via an interface Uu and an interface PC5 at the same time. Remote UE may have to send information via an interface Uu and an interface PC5 at the same time. If remote UE has but a single transceiver, and has to guarantee communication at an interface PC5, which is of a higher priority, then the remote UE may send the relay a request for a PC5 communication gap.

The remote UE may send the relay the request by PC5, by at least one of AS signaling, NAS signaling, application stratum signaling, etc.

The request may include at least one of a location of a sub-frame, a frequency, a reception or sending indication, etc. The request may further include a SA or data indication.

In S1006, the relay may forward, to an eNB, the request for the PC5 communication gap.

The relay may forward the request by an interface Uu. The request may be sent by at least one of RRC signaling, MAC CE, physical-stratum signaling, etc.

The relay may transfer the request transparently. Namely, the relay may analyze no content of the request, add head information needed, and send the request to the eNB directly. Alternatively, the relay may analyze the request, process the request properly, and then send the processed request to the eNB.

In S1008, the eNB may inform the remote UE of a PC5 communication gap configuration.

The eNB may inform the remote UE of the PC5 communication gap configuration via an interface Uu. Alternatively, the eNB may inform the remote UE of the PC5 communication gap configuration via a relay.

The configuration may include information on at least one of a location of a PC5 communication gap sub-frame, a cycle of a PC5 communication gap, a frequency, etc. A cycle of a PC5 communication gap may be set to be consistent with a cycle of a resource pool for PC5 communication. The frequency may apply to the PC5 communication gap. The configuration may further include a reception or sending indication.

An eNB may accept or turn down a request for a PC5 communication gap. After an eNB has configured a PC5 communication gap, the eNB may cancel the PC5 communication gap configuration.

In S1010, the remote UE may communicate according to the PC5 communication gap configuration.

Remote UE may perform PC5 communication with a relay according to a PC5 communication gap configuration. If random access is to be performed at a PC5 communication gap sub-frame, then the remote UE may perform random access first. If a measurement gap has been configured at a PC5 communication gap sub-frame, the remote UE may perform processing according to a rule pre-defined or as indicated by an eNB.

A relay UE may request a PC5 communication gap.

Figure 11:
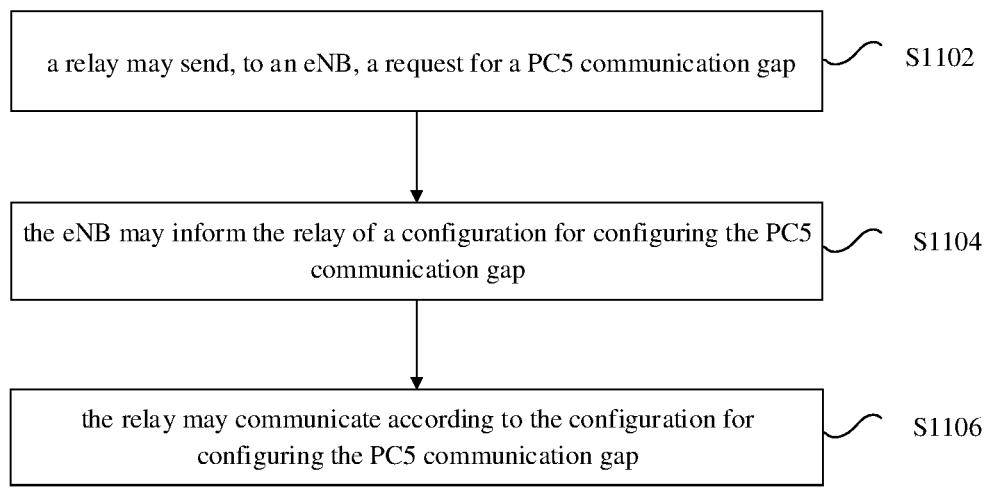
FIG. 11 is a flowchart according to an embodiment herein.

FIG. 11 is a flowchart according to an embodiment herein. An embodiment herein provides a method for requesting a PC5 communication gap by a relay. Referring to FIG. 11, the method may include an option as follows.

In S1102, a relay may send an eNB a request for a PC5 communication gap.

A relay may be at least one of a UE-to-network relay, a UE-type RSU, etc. A UE-to-network relay may be a Stratum 2 or Stratum 3 relay.

A relay may receive, via an interface Uu, information sent by an eNB, and at the same time may receive, via PC5, information sent by remote UE. A relay may send information to an eNB via an interface Uu, and at the same time may send information to remote UE via PC5. If a relay has but a single transceiver, to guarantee QoS of PC5 communication, the relay may send an eNB a request for a PC5 communication gap.

In S1104, the eNB may inform the relay of a PC5 communication gap configuration.

The eNB may send information on the PC5 communication gap configuration by an interface Uu.

In S1106, the relay may communicate according to the PC5 communication gap configuration.

A relay may perform PC5 communication with remote UE according to a PC5 communication gap configuration. If random access is to be performed at a PC5 communication gap sub-frame, then the relay may perform random access first. If a measurement gap has been configured at a PC5 communication gap sub-frame, the relay may perform processing according to a rule pre-defined or as indicated by an eNB.

An eNB may cancel a PC5 communication gap configuration.

Figure 12:
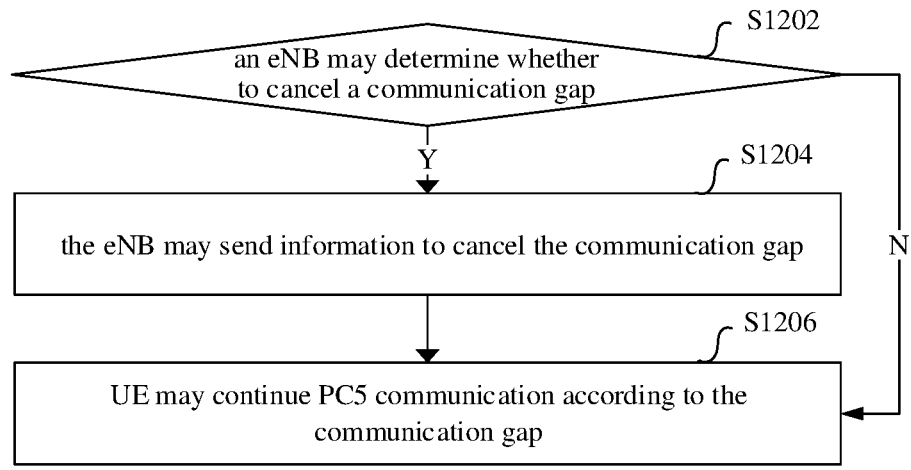
FIG. 12 is a flowchart according to an embodiment herein.

FIG. 12 is a flowchart according to an embodiment herein. An embodiment herein provides a method for cancelling a PC5 communication gap configuration. Referring to FIG. 12, the method may include an option as follows.

In S1202, an eNB may determine whether to cancel a PC5 communication gap. If so, the flow may continue at S1204. Otherwise, the flow may continue at S1206.

An eNB may determine whether to cancel a PC5 communication gap according to a network load and/or an Operation, Administration, and Maintenance (OAM) indication. IF a Uu is being heavily loaded, or an OAM has indicated that a PC5 communication gap is to be cancelled, an eNB may cancel a PC5 communication gap for any UE or that for specific UE. Otherwise if a Uu is not being heavily loaded and there is no OAM indication to cancel a PC5 communication gap, an eNB may continue supporting the PC5 communication gap.

In S1204, the eNB may send an indication to cancel the PC5 communication gap.

An eNB may indicate to cancel any/all PC5 communication gap by a system message, such as by setting a field supporting the PC5 communication gap to be false or 0, i.e., not supporting the PC5 communication gap. To cancel a PC5 communication gap dedicated to specific UE, the eNB may send a cancel indication to the specific UE by at least one of RRC signaling, physical-stratum signaling, MAC CE, etc.

An eNB may cancel a PC5 communication gap by a timer. For example, the PC5 communication gap may be cancelled upon expiration/timeout of the timer.

In S1206, UE may continue PC5 communication according to a configuration.

A structure of a system according to an embodiment herein may be as follows.

Figure 13:
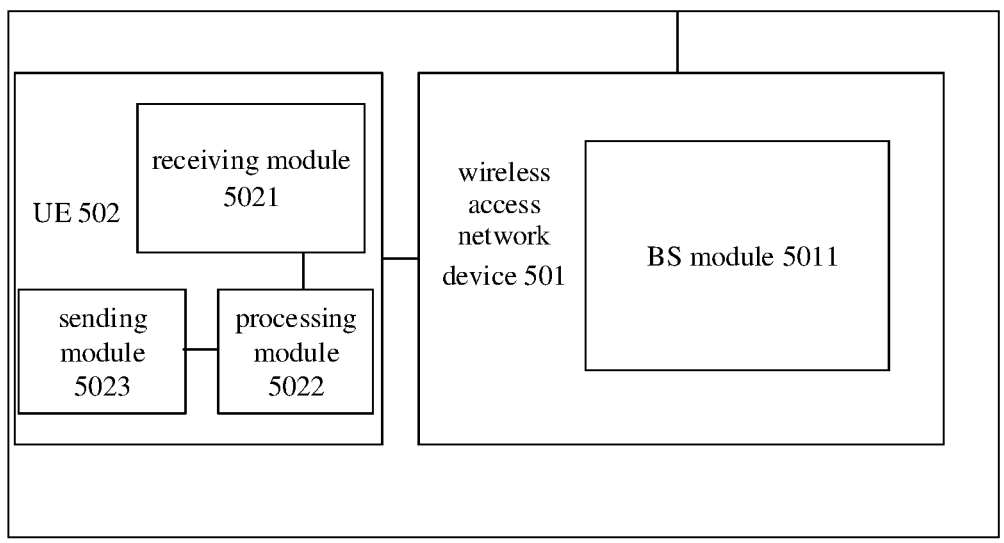
FIG. 13 is a diagram of a structure according to an embodiment herein.

An embodiment herein provides a system for setting a gap. FIG. 13 is a diagram of a structure according to an embodiment herein. Referring to FIG. 13, the system may include a wireless access network device 501 and UE 502. The wireless access network device 501 may include a BS 5011. The UE 502 may include a receiving module 5021, a processing module 5022, and a sending module 5023. The receiving module 5021 may be arranged for receiving, by an air interface, information on a PC5 communication gap sent by the BS module 5011. The processing module 5022 of the UE 502 may be arranged for determining a required PC5 communication gap. The sending module 5023 of the UE 502 may be arranged for sending a request for a PC5 communication gap to the BS module 5011. The BS module 5011 may be arranged for informing the UE 502 of the PC5 communication gap and receiving the request for the PC5 communication gap sent by the UE 502.

A scene of application may be as follows.

A Wearable device may communicate with a relay by an interface PC5. A Wearable device may receive information sent by an eNB by an interface Uu. A relay may communicate with an eNB by an interface Uu.

Wearable UE (W-UE) and a relay may receive information form Uu and PC5. W-UE and a relay may send information via interfaces Uu and PC5. W-UE and a relay may have a single transceiver. An eNB may support a request for a PC5 communication gap.

W-UE may request a PC5 communication gap from an eNB via a relay. A relay may send an eNB a request for a PC5 communication gap (per se or forwarded from W-UE).

An eNB may inform a relay or W-UE of a PC5 communication gap configuration.

A relay may perform PC5 communication according to a PC5 communication gap configuration.

W-UE may perform PC5 communication according to information on a PC5 communication gap configuration received directly or via a relay.

An eNB may cancel a PC5 communication gap configuration as needed.

Note that the modules herein may be implemented by software or hardware. The modules may all be located in one processor. Alternatively, the modules may be located respectively in more than one processor. The implementation of the modules herein is not limited so.

Each module in a device for configuring a communication gap according to an embodiment herein may be implemented by a processor in UE or in a BS. Function of a processor may as well be implemented by a logic circuit. A processor may be a Central Processing Unit (CPU), a Micro Processing Unit (MPU), a Digital Signal Processor (DSP), a Field-Programmable Gate Array (FPGA), etc.

When implemented in form of a software functional module and sold or used as an independent product, a method herein may also be stored in a transitory or non-transitory computer-readable storage medium. Based on such an understanding, the essential part or a part contributing to prior art of the technical solution of an embodiment herein may appear in form of a software product, which software product is stored in a storage medium, and includes a number of instructions for allowing computer equipment (such as a personal computer, a server, network equipment, and/or the like) to execute all or part of the methods in various embodiments herein. The storage medium includes various media that can store program codes, such as a U disk, a mobile hard disk, Read Only Memory (ROM), a magnetic disk, a CD, and/or the like. Thus, an embodiment herein is not limited to any specific combination of hardware and software.

An embodiment herein provides a storage medium storing program codes for executing an option as follows.

In S1, a request for a communication gap at an interface sent by UE is received. The interface may be an inter-UE interface.

In S2, the UE is informed, according to the request for the communication gap at the interface, of an interface communication gap configuration. The UE configures the communication gap at the interface according to the interface communication gap configuration. The UE communicates based on the communication gap configured.

An embodiment herein provides a storage medium storing program codes for executing an option as follows.

A request for a communication gap at an interface is sent to a BS. The interface may be an inter-UE interface.

Information on an interface communication gap configuration, which is sent by the BS according to the request for the communication gap at the interface, is received. UE configures, according to the interface communication gap configuration, the communication gap at the interface. The UE communicates based on the communication gap configured.

The storage media include but are not limited to various media that can store program codes, such as a U disk, Read-Only Memory (ROM), Random Access Memory (RAM), a mobile hard disk, a magnetic disk, a CD, and/or the like.

Refer to an example in an aforementioned embodiment for this example, which is not elaborated.

Based on an aforementioned embodiment, an embodiment herein provides a BS. The BS includes: a storage medium for storing executable instructions; and a processor for executing the executable instructions stored.

The executable instructions may include: receiving a request for a communication gap at an inter-UE interface sent by User Equipment (UE); and informing the UE according to the request for the communication gap at the inter-UE interface, of an interface communication gap configuration. The UE configures the communication gap at the inter-UE interface according to the interface communication gap configuration. The UE communicates based on the communication gap configured.

Based on an aforementioned embodiment, an embodiment herein provides a UE. The UE includes: a storage medium for storing executable instructions; and a processor for executing the executable instructions stored.

The executable instructions may include: sending, to a Base Station (BS), a request for a communication gap at an inter-UE interface; receiving information on an interface communication gap configuration sent by the BS according to the request for the communication gap at the inter-UE interface; configuring, according to the interface communication gap configuration, the communication gap at the inter-UE interface; and communicating based on the communication gap configured.

Clearly, a person having ordinary skill in the art will know that modules or options in embodiments herein may be realized using a universal computing device, and may be integrated in a single computing device or distributed in a network formed by multiple computing devices. Optionally, they may be realized using computing device executable program codes, and thus may be stored in a storage device and executed by a computing device. In some cases, the options may be executed in an order different from that illustrated or described here, or may each be made into an Integrated Circuit module. Multiple modules or options herein may be realized by being made into a single Integrated Circuit module. Thus, an embodiment herein is not limited to a specific combination of hardware and software.

What described are but embodiments herein, and are not intended to limit the subject disclosure. Various modifications and variations may be devised by a person having ordinary skill in the art. Any modification, equivalent replacement, improvement, etc., made within the spirit and principle of the subject disclosure should be included in the scope of the subject disclosure.

INDUSTRIAL APPLICABILITY

With embodiments herein, a BS receives a request for a communication gap at an interface sent by UE. The interface may be an inter-UE interface. The BS informs the UE, according to the request for the communication gap at the interface, of an interface communication gap configuration. The UE configures the communication gap at the interface according to the interface communication gap configuration. The UE communicates based on the communication gap configured. With the technical solution herein, a technical definition of a design of a PC5 communication gap is provided. PC5 and Uu operations are thus supported at the same time. Thereby, UE is allowed to support operations with other UE and with a BS at the same time.

The invention claimed is:

1. A method for configuring a communication gap, comprising:
receiving, by a Base Station (BS), a request for a communication gap at an inter-UE interface sent by User Equipment (UE); and
informing the UE by the BS according to the request for the communication gap at the inter-UE interface, of an interface communication gap configuration, so that the UE configures the communication gap at the inter-UE interface according to the interface communication gap configuration and communicates based on the communication gap configured;

wherein the method further comprises: setting a second priority of communication via an interface Uu to be higher than a first priority of communication via the inter-UE interface, in response to that the UE is in random access or a measurement gap.

2. The method of claim 1, wherein the receiving, by a Base Station (BS), a request for a communication gap at an inter-UE interface sent by User Equipment (UE) comprises:
receiving, by the BS, the request for the communication gap at the inter-UE interface sent by the UE; or
receiving, by the BS via a relay, the request for the communication gap at the inter-UE interface sent by the UE.

3. The method of claim 2, wherein the relay comprises at least one of a UE-to-network relay or a UE-type Road Side Unit (RSU).

4. The method of claim 1, further comprising: before the receiving, by a Base Station (BS), a request for a communication gap at an inter-UE interface sent by User Equipment (UE),
sending, by the BS to the UE, an interface communication gap indication indicating whether the BS supports the communication gap at the inter-UE interface.

5. The method of claim 4, wherein the sending, by the BS to the UE, an interface communication gap indication comprises:
sending, by the BS to the UE, the interface communication gap indication by at least one of system broadcast information, Radio Resource Control (RRC) signaling, physical-stratum signaling, or Media Access Control (MAC) Control Element (CE) signaling.

6. The method of claim 1, comprising at least one of:
receiving, by the BS, the request for the communication gap at the inter-UE interface comprising: receiving, by the BS, the request for the communication gap at the inter-UE interface by at least one of Radio Resource Control (RRC) signaling, physical-stratum signaling, or Media Access Control (MAC) Control Element (CE) signaling; and
informing the UE by the BS according to the request for the communication gap at the inter-UE interface, of the interface communication gap configuration comprising: informing of the interface communication gap configuration by at least one of RRC signaling, physical-stratum signaling, or MAC CE signaling.

7. The method of claim 1,
wherein the request for the communication gap at the inter-UE interface comprises at least one of information on a location of an interface communication gap sub-frame, an interface communication frequency, an interface reception or sending indication, or a Scheduling Assignment (SA) or data indication,
wherein the interface reception or sending indication indicates whether the communication gap is for reception or sending at the inter-UE interface,
wherein the SA or data indication indicates whether the communication gap is for data or SA at the inter-UE interface,
wherein the interface communication gap sub-frame is for communication via the inter-UE interface,
wherein the interface communication frequency refers to a carrier frequency used for communication via the inter-UE interface.

8. The method of claim 1,
wherein the interface communication gap configuration comprises at least one of a configuration of an interface communication gap sub-frame, a cycle of the communication gap, a carrier frequency used at the communication gap, an interface reception or sending indication, or a Scheduling Assignment (SA) or data indication.

9. The method of claim 1, further comprising:
in response to that the BS has turned down the request by the UE, informing, by the BS, of no interface communication gap configuration, or sending a turndown indication to the UE.

10. The method of claim 1, further comprising:
cancelling, by the BS, the interface communication gap configuration being informed of, by at least one of sending an indication to cancel the interface communication gap configuration, informing of a new communication gap configuration, or configuring a timer for cancelling the interface communication gap configuration being informed of upon expiration of the timer.

11. The method of claim 1,
wherein the inter-UE interface comprises at least one of an interface PC5, a Vehicle-to-Vehicle Communication (V2V) interface in Long Term Evolution (LTE), a Vehicle-to-Infrastructure Communications (V2I) interface in LTE, a Vehicle-to-Pedestrian Communications (V2P) interface, a Wireless Fidelity (WiFi) interface, a Bluetooth (BT) interface, or a Dedicated Short Range Communication (DSRC) interface.

12. A non-transitory computer storage medium, storing therein computer-executable instructions for executing the method of claim 1.

13. A Base Station (BS), comprising: a storage medium for storing executable instructions; and a processor for executing the executable instructions stored to execute the method of claim 1.

14. A method for configuring a communication gap, comprising:
sending, by User Equipment (UE) to a Base Station (BS), a request for a communication gap at an inter-UE interface;
receiving, by the UE, information on an interface communication gap configuration sent by the BS according to the request for the communication gap at the inter-UE interface;
configuring, by the UE, according to the interface communication gap configuration, the communication gap at the inter-UE interface; and
communicating by the UE, based on the communication gap configured;
wherein the method further comprises: setting a second priority of communication via an interface Uu to be higher than a first priority of communication via the inter-UE interface, in response to that the UE is in random access or a measurement gap.

15. The method of claim 14, wherein the sending, by User Equipment (UE) to a Base Station (BS), a request for a communication gap at an inter-UE interface comprises:
sending, by the UE to the BS, the request for the communication gap at the inter-UE interface; or
sending, by the UE to the BS via a relay, the request for the communication gap at the inter-UE interface.

16. The method of claim 14, further comprising: before the sending, by User Equipment (UE) to a Base Station (BS), a request for a communication gap at an inter-UE interface,
receiving, by the UE, an interface communication gap indication sent by the BS indicating whether the BS supports the communication gap at the inter-UE interface.

17. The method of claim 14, comprising at least one of:

sending, by the UE to the BS, the request for the communication gap at the inter-UE interface comprising: sending the request for the communication gap at the inter-UE interface by at least one of Radio Resource Control (RRC) signaling, physical-stratum signaling, or Media Access Control (MAC) Control Element (CE) signaling; and receiving, by the UE, information on the interface communication gap configuration comprising: receiving the information on the interface communication gap configuration by at least one of the RRC signaling, the physical-stratum signaling, or the MAC CE signaling.

18. The method of claim 14, wherein the sending, by User Equipment (UE) to a Base Station (BS), a request for a communication gap at an inter-UE interface comprises sending the request for the communication gap at the inter-UE interface in response to at least one of:

an interface communication gap indication received by the UE indicating that the BS supports the communication gap at the inter-UE interface;

that an upper stratum of the UE has requested the communication gap, the upper stratum comprising an application stratum, a service stratum, or a Non-Access Stratum (NAS);

a change in configuration to the UE of a resource for communication at the inter-UE interface; or a change in a demand for the communication gap by the UE.

19. User Equipment (UE), comprising: a storage medium for storing executable instructions; and a processor for executing the executable instructions stored to execute the method of claim 14.

20. A non-transitory computer storage medium, storing therein computer-executable instructions for executing the method of claim 14.

* * * * *